ROLAND L. BIENVENUE
JOHN W. WALLACE
INVENTORS

BY *Joseph C. Ryan*
ATTORNEY

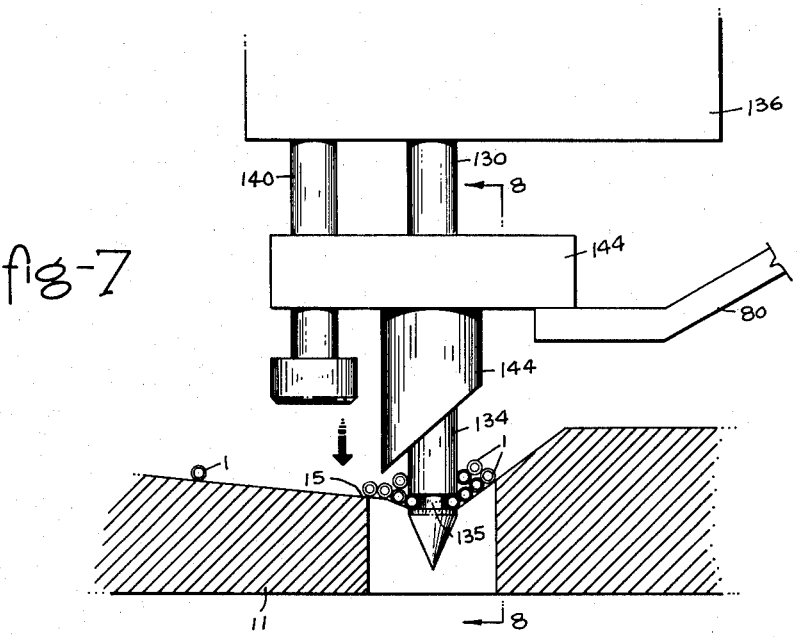
fig-7
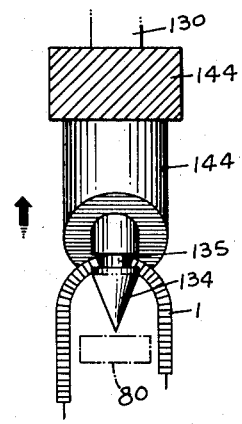
fig-8
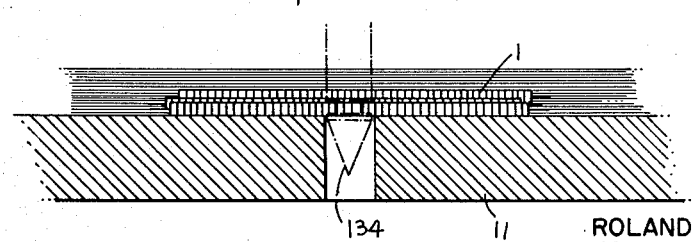
ROLAND L. BIENVENUE
JOHN W. WALLACE
INVENTOR
BY Joseph C. Ryan
ATTORNEY

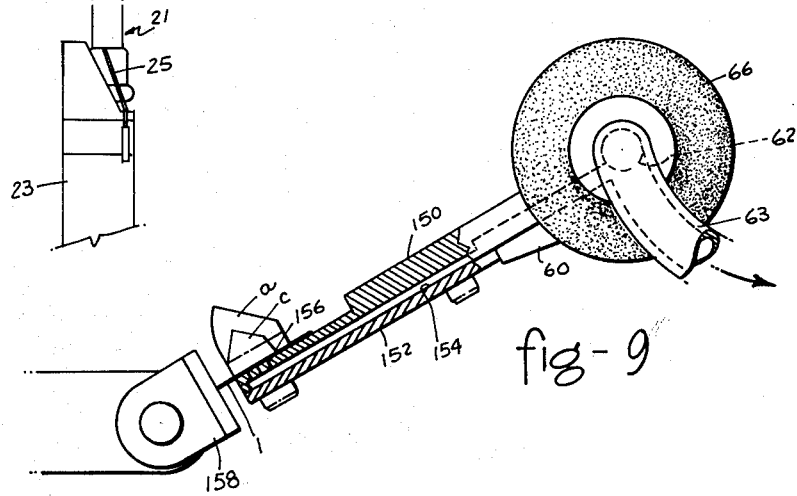
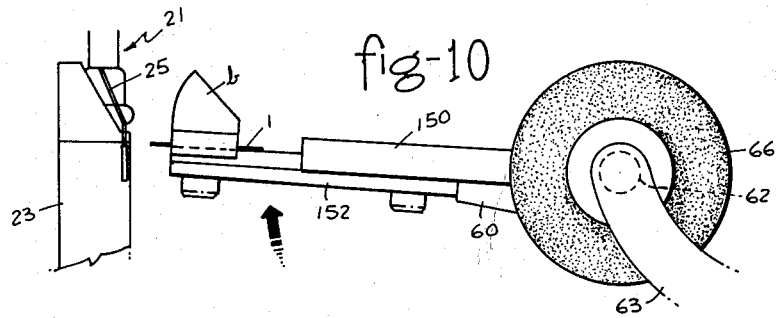
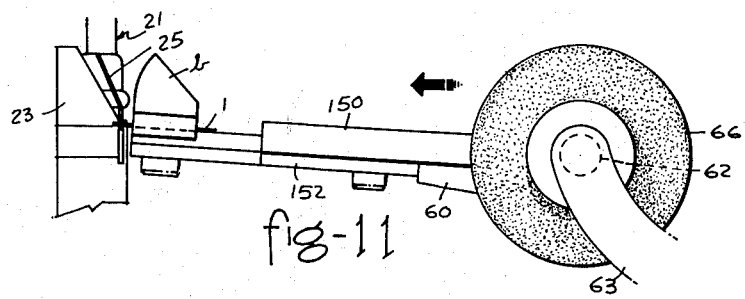
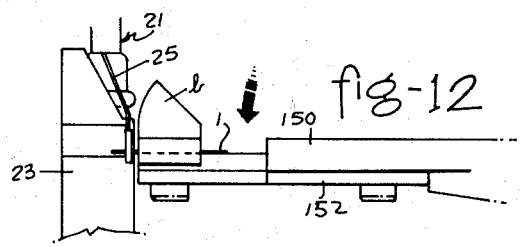

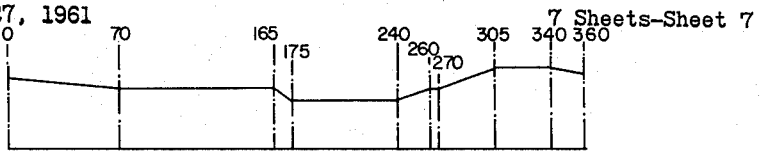
HORIZONTAL TRANSFER CAM 94
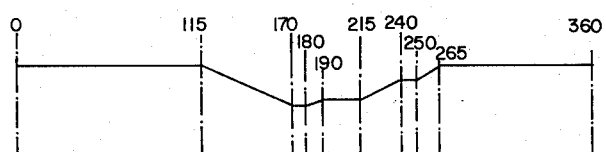
ROCKING TRANSFER CAM 84
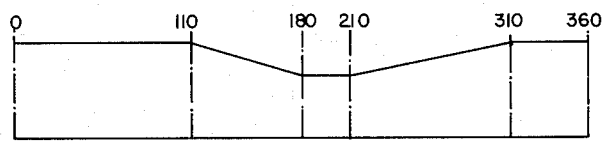
VERTICAL PICK UP CAM 28
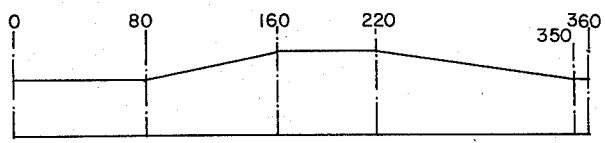
HORIZONTAL PICKUP CAM 30
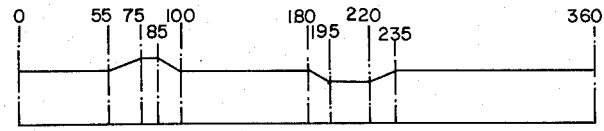
FINGER RELEASE CAM 112
fig-13

United States Patent Office 3,097,753
Patented July 16, 1963

3,097,753
ARTICLE PICKUP AND TRANSFER METHOD AND APPARATUS
John W. Wallace, Salem, and Roland L. Bienvenue, Lawrence, Mass., assignors to Sylvania Electric Products Inc., a corporation of Delaware
Filed Mar. 27, 1961, Ser. No. 98,466
5 Claims. (Cl. 214—1)

This invention relates to the manufacture of electrical energy translating devices, such as lamps, radio tubes and the like. More particularly, this invention relates to the manufacture of those electrical energy translating devices which are provided with lead-in wires, support wires, filaments and the like.

One of the operations associated with the manufacture of electrical energy translating devices having one or more filaments as a component thereof is the selection of a filament from a supply thereof and presenting it to an intermediate article of work for assembly therewith to define a unitary structure. For example, in the manufacture of incandescent lamps, one of the operations associated therewith is the selection of a filament from a supply thereof and the presentation of the selected filament to support wires, such as lead-in wires for example, to be secured thereto in the manufacture of the lamp stem. Incandescent lamps are made in a large variety of sizes, shapes, etc.; some are quite large and others are quite small. Insofar as the larger lamps, such as 60 watt, 100 watt, etc., are concerned, various devices have been developed over the years to provide for fully automatic mechanical means for selecting a filament from a supply thereof and presenting it to the lead-in wires of a lamp stem during the manufacture thereof.

However, when one gets down in the region below 25 watt lamps for example, the geometry of the filament is such that the design of a fully automatic unit reliable enough to be integrated into a high speed line of manufacturing equipment poses quite a problem. As a matter of fact, to the best of our knowledge no such unit is presently available commercially nor has it been shown in the patent literature.

In view of the foregoing, a principal object of this invention is to automatically select wires, filaments and the like of very small size from a supply thereof.

Another object of this invention is to provide a method of and apparatus for picking up such an article from a supply thereof and presenting it to an article of work to which it may be joined.

A further object is to provide a method of and apparatus for automatically selecting a coiled filament of very small diameter from a supply thereof, orienting it, and presenting it to a pair of support wires, such as lead-in wires for example, for assembly therewith.

These and other objects, advantages and features of our invention are attained, in accordance with the principles thereof, by dipping a needle into a reservoir of wires, such as filaments for example, from which the needle selects one filament, presenting the filament selected by the needle to a transfer head, orienting the filament on the transfer head and presenting the oriented filament to an article of work, such as a lamp stem for example, to be joined therewith. In the specific embodiment of our invention illustrated in the accompanying drawings and described below, the filament pickup needle is a substantially cylindrical member conical at one end and having a filament-receiving groove formed therein. A tapered filament-entrapping collar cooperates with the filament-receiving groove in the pickup needle to grasp a filament from a reservoir thereof substantially at its longitudinal center and present it to a filament transfer head. While disposed on the filament transfer head, the filament is oriented and then secured in oriented position, preferably by means of suction. The oriented, secured filament is then presented by the filament transfer head to the article of work with which it is to be joined, such as the hooked ends of a pair of lead-in wires of a lamp stem for example. One of the features of our method and apparatus is the technique employed to present the free ends of the filament to the hooked lead-in wires. Instead of threading them into the hooks, they are initially presented to the hooks some distance above the bights thereof and then moved downwardly within the hooks toward and, if desired, actually into engagement with the bights to which they are then clamped or otherwise secured.

We have found that the foregoing method and apparatus makes possible the handling of filaments of very small diameter and of substantial length. For example, this method and apparatus may be employed successfully in handling coiled filaments formed from wire about one-half mil in diameter, shaped to about 4 or 5 mils coil diameter and being about 25 millimeters in length. In handling filaments of this order of magnitude, best results are obtained when the width of the filament-receiving groove is between about 10% to 15% greater than the coiled filament and the depth of the filament-receiving groove is between about 10% to 15% less than the diameter of the coiled filament.

In the specific embodiment of our invention illustrated in the accompanying drawings and described below, FIGURE 1 is an elevational view of the filament pickup assembly showing the filament pickup needle assembly and the drive mechanisms for providing the horizontal and the vertical components of the reciprocating stroke of the needle as it moves between its pickup and its delivery positions.

FIGURE 7 is a fragmentary detail on an enlarged scale of a portion of the structure shown in FIGURE 4.

FIGURE 8 is a fragmentary detail looking in the direction 8—8 of FIGURE 7 but with the pickup needle assembly retracted from the reservoir in order to show a filament grasped thereby and depending therefrom.

FIGURE 9 is a fragmentary detail partly in section of the filament transfer head assembly showing the channels and ports which comprise the means through which a suction force is provided to secure the filament to the transfer head. Two of the three filament guides on the front end of the transfer head, the filament-orienting stop and the lamp stem to which the filament is to be delivered are also shown in this figure.

FIGURE 10 is a fragmentary detail of the filament transfer head showing its relative position with respect to the lamp stem, to which it is to deliver the filament which it carries, at the end of the clockwise component of its delivery stroke.

FIGURE 11 is a view similar to FIGURE 10 showing the filament transfer head at the end of the horizontal component of its delivery stroke.

FIGURE 12 is a view similar to FIGURE 11 showing the filament transfer head at the end of the the counterclockwise component of its delivery stroke. This view shows the filament fully delivered to the hooked lead-in wires of the lamp stem.

FIGURE 13 is a cam chart illustrating the operating cycle of each of the several cams which actuate the filament pickup needle assembly and the filament transfer head assembly.

Figure 1:
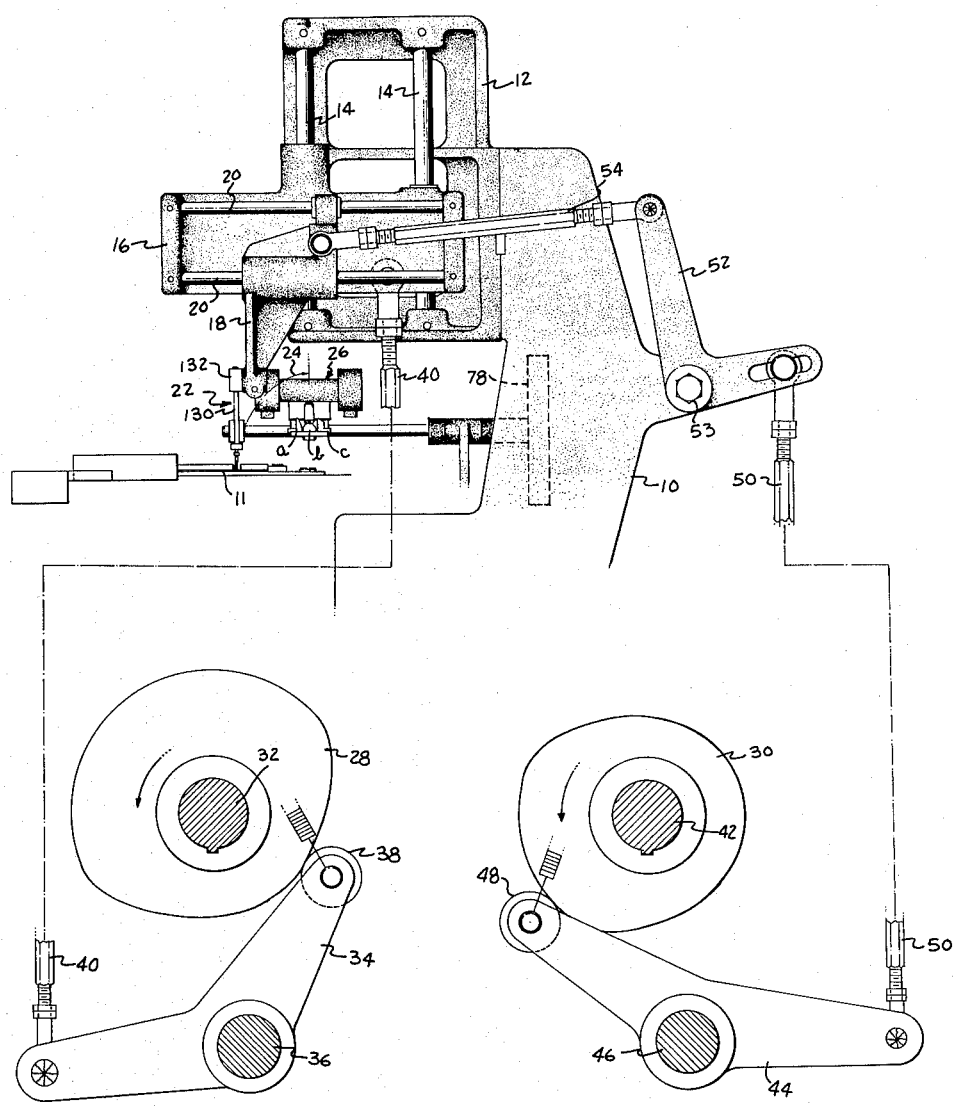
Figure 2:
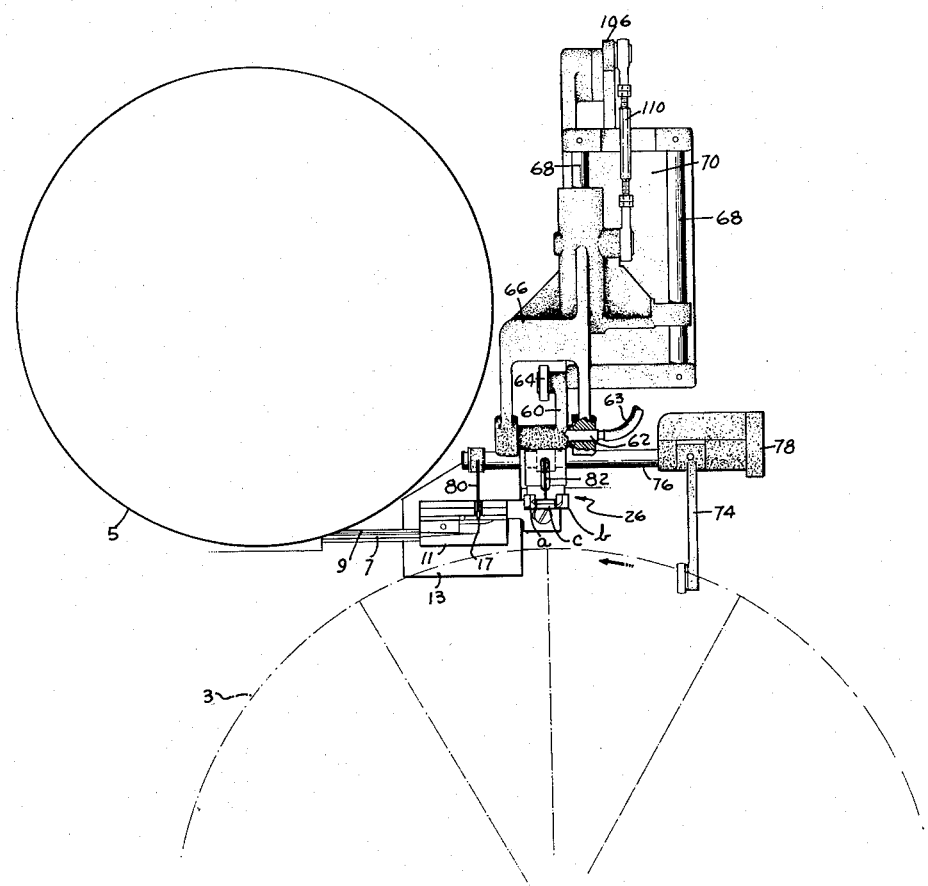
FIGURE 2 is a plan view of the filament transfer assembly showing particularly its relative location with respect to the filament feeding assembly and the reservoir from which the filament pickup needle selects a filament on the one hand, and the mount machine to which the filament transfer head delivers a filament on the other hand.
Figure 3:
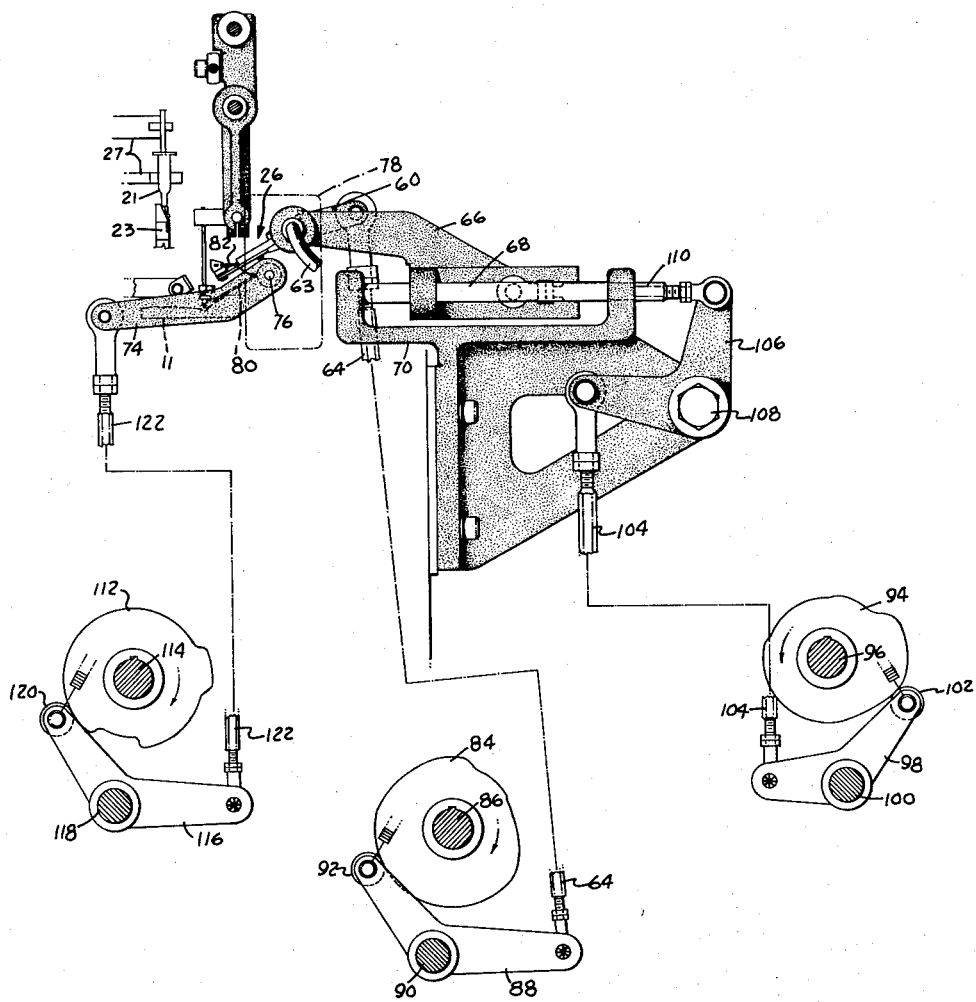
FIGURE 3 is an elevational view of the filament transfer assembly, showing its relative location with respect to the filament pickup needle from which it receives a filament and a lamp stem to which it delivers the filament. The drive mechanisms for providing the horizontal and the rocking components of the working stroke of the filament transfer head are also illustrated in this figure.

Referring now to the drawings, particularly FIGURES 1–3, the major components of the apparatus illustrated therein comprise a filament pickup assembly and a filament transfer assembly. FIGURE 1 is an elevational view of the filament pickup assembly. FIGURE 2 is a plan view of the filament transfer assembly, showing particularly its relative location with respect to the filament feeder from which the filament is fed into a reservoir for selection by the pickup assembly on the one hand, and the mount machine to which a filament is delivered by the filament transfer assembly on the other hand. FIGURE 3 is an elevational view of the filament transfer assembly, showing particularly its relative location with respect to the filament pickup needle of the filament pickup assembly on the one hand, and a lamp stem to which a filament is delivered by the filament transfer assembly on the other hand.

Referring now to FIGURE 1, the main base member of the filament pickup assembly is a stationary base bracket 10. A slide supporting bracket 12, within which a pair of spaced rods 14 are supported, is attached to the stationary base bracket 10. A vertical slide 16 is slidably disposed on the rods 14 of bracket 12. A horizontal slide 18 is slidably disposed on a pair of spaced rods 20 with which the vertical slide 16 is provided. A filament pickup needle assembly 22, the details of which are described below, is attached to and depends from horizontal slide 18.

In operation, the filament pickup needle assembly, while disposed in the relative position thereof shown in FIGURE 1, selects one filament from a supply thereof in a manner described more fully below and is then caused to move through a curved path illustrated by the curved arrow 24 to a position above and in register with a filament transfer head 26 onto which the filament is dropped. The vertical component of this movement is effected by cam 28 and the horizontal component by the cam 30. Cam 28 is keyed to cam shaft 32. A rocker arm 34, attached intermediate its ends to rocker arm shaft 36, is provided with a cam follower 38 supported on one end thereof. A connecting rod 40 connects the other end of the rocker arm 34 to the vertical slide 16. Cam 30 is keyed to cam shaft 42. A rocker arm 44, attached intermediate its ends to rocker arm shaft 46, is provided with a cam follower 48 supported on one end thereof. A connecting rod 50 connects the other end of the rocker arm 44 to one end of bellcrank lever 52 pivotally mounted intermediate its ends at 53 on stationary base bracket 10. A connecting rod 54 connects the other end of the bellcrank lever 52 to the horizontal slide 18. The cams 28 and 30, in their operation, cooperate to cause the filament pickup needle assembly 22 to move through the curved path schematically illustrated by the curved arrow 24 to deliver a filament from reservoir 11 to the filament transfer head 26. The cam 30, through the mechanism just described, effects horizontal displacement of horizontal slide 18 on rods 20 and thus horizontal displacement of the filament pickup needle assembly 22 since the needle assembly is attached to this slide. The cam 28, through the mechanism just described, effects vertical displacement of vertical slide 16 on rods 14 and thus vertical displacement of the horizontal slide 18 and the filament pickup needle assembly 22 depending therefrom.

The general organization of the filament transfer assembly, the unit to which the filament pickup assembly just described delivers a filament, will now be described, reference being made primarily to FIGURES 2 and 3. Referring initially to FIGURE 2, it will be noted that this assembly is located adjacent to a mount machine 3 to which the filament is delivered by the transfer assembly and a filament feeder 5 of the vibratory bowl type, both of these units 3 and 5 being shown schematically since they do not constitute an integral part of this invention. The mount machine may be of the type described in U.S. Patent 2,637,144 which issued on May 5, 1953 to R. M. Gardner et al. Extending tangentially from the filament feeder 5 is a filament feeding finger 7 which has a channel 9 therein through which filaments are caused to travel from the filament feeder 5 to a reservoir 11 mounted on a bracket 13. This reservoir 11 is usually kept supplied with a plurality of filaments and the filament pickup needle assembly 22, described above in connection with FIGURE 1, picks up one filament from the reservoir 11 and drops it on the filament transfer head 26. Means not shown are provided for vibrating the reservoir 11. We have found that when the article of work is a wire about one-half mil in diameter, coiled to define a coiled filament about 3 mils in outside diameter, vibration of the reservoir contributes substantially to insuring the continuing flow of filaments or wires into the reservoir. It also contributes to keeping the filaments or wires lined up in a uniform manner in the reservoir, thus contributing to the highly efficient operation of the pickup needle. On the other hand, if the article of work is somewhat larger in diameter, vibration of the reservoir is not such a significant factor and may be omitted.

As shown in FIGURES 2 and 3, the filament transfer head 26 is attached to one end of a rocker arm 60 which is pinned intermediate its ends to a tube 62, the other end of rocker arm 60 having one end of a connecting rod 64 connected thereto. The tube 62 is freely rotatable within the bifurcated ends of a slide 66 and has an air line 63 connected to one end thereof. The slide 66 is reciprocatively supported on a pair of rods 68 mounted in a slide supporting bracket 70. A filament release lever 74 is pivotally mounted at one end thereof on a rock shaft 76 which is rotatably supported at one end thereof in a bifurcated stationary bracket 78. A finger 80 is pinned to the other end of the rock shaft 76 and a finger 82 is pinned to the shaft 76 intermediate the ends thereof. As shown in FIGURE 2, the finger 80 extends toward the reservoir 11 whereas the finger 82 is associated with the filament transfer head 26. The function and purpose of these two fingers will be described more fully below in connection with the description of other figures of the drawings.

It will be noted that in FIGURE 3, three separate drives are shown and they will now be described. A filament transfer head rocking cam 84 is keyed to shaft 86. A rocker arm 88, mounted intermediate its ends on rocker arm shaft 90, is provided with a cam follower 92 at one end thereof which rides on cam 84. One end of connecting rod 64 is connected to the other end of rocker arm 88. As was mentioned above, the other end of connecting rod 64 is connected to rocker arm 60 on which the filament transfer head 26 is mounted. This mechanism provides the means whereby the rocker arm 60 and the filament transfer head 26 may be rocked on the tube 62 as a pivot point.

A filament transfer cam 94 is keyed to shaft 96. A rocker arm 98, mounted intermediate its ends on rocker arm shaft 100, is provided with a cam follower 102 at one end thereof which rides on cam 94. Connecting rod 104 connects the other end of rocker arm 98 to one end of a bellcrank lever 106 pivotally mounted intermediate its ends at 108 in bracket 70. Connecting rod 110 connects the other end of bellcrank lever 106 to slide 66. This mechanism provides the means for effecting reciprocation in a horizontal plane of the slide 66 and consequently the rocker arm 60 and the filament transfer head 26.

A finger release cam 112 is keyed to shaft 114. A rocker arm 116, mounted intermediate its ends on rocker arm shaft 118, is provided with a cam follower 120 at one end thereof which rides on cam 112. Connecting rod 122 connects the other end of rocker arm 116 to an end of filament release lever 74. This mechanism provides the means for rocking the lever 74 on the shaft 76 on which it is mounted and thus effect clockwise and counterclockwise movement of the fingers 80 and 82 which are pinned to the shaft 76.

Figure 4:
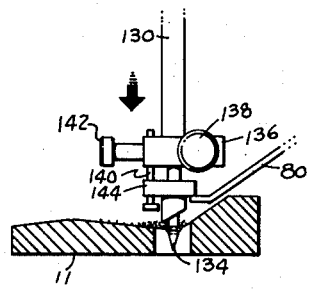
FIGURE 4 is a fragmentary detail, partly in section, of the pickup needle assembly showing the needle thereof in the filament reservoir.

As described above in connection with the description of FIGURE 1, the filament pickup needle assembly 22 is attached to and depends from the horizontal slide 18. This filament pickup needle assembly 22 includes means for selecting one filament from the supply thereof in reservoir 11. This means will now be described, reference being made initially to FIGURES 1 and 4. The filament pickup needle assembly comprises a needle holder 130 attached at one end thereof to a block 132 which is in turn attached to the horizontal slide 18. A filament pickup needle 134 is attached to and projects from the other end of needle holder 130. A collar 136 is attached to the needle holder 130 by screw 138. A pin 140, secured to collar 136 by screw 142, depends from the collar 136. A filament entrapping collar 144, slidably disposed on needle 134 and pin 140, normally is supported by and rests on the head of pin 140. Although the filament entrapping collar 144 normally rests on the head of pin 140, it is displaced therefrom during the final phase of the downward stroke of the filament pickup needle assembly 22 by the finger 80 as shown in FIGURE 4. It will be recalled that, as desicribed above in the description of FIGURES 2 and 3, the finger 80 is pinned to rock shaft 76.

FIGURE 7 is an enlarged fragmentary detail of the filament pickup needle assembly 22 and the reservoir 11 into which the needle 134 dips. The relative position of this assembly as shown in FIGURE 7 is the same as that shown in FIGURE 4. As is illustrated in FIGURE 7, the reservoir 11 is provided with an inclined surface terminating in a trough 15. As described above in connection with the description of FIGURE 2, filaments are fed from the feeder 5, through channel 9 in feeder finger 7 and onto the top surface of the reservoir 11. The filaments so fed roll down the inclined surface of the reservoir and collect in the trough 15. As will be noted in FIGURE 2, the trough 15 is provided with an aperture 17 therein.

In operation, as the needle 134 is caused to move downwardly, the tip of the finger 80 lies in the path of the filament entrapping collar 144, thus arresting the downward movement thereof, although the finger 80 does not prevent further downward movement of the rest of the filament pickup needle assembly 22 (FIG. 7). The tip of the needle 134 engages the collection of filaments 1 in the trough 15 and displaces them somewhat as shown in FIGURE 7 as it moves therethrough and through the aperture in the trough. At the end of the downward stroke, the needle 134 will be disposed substantially as shown in FIGURE 7. When so disposed, the filaments 1 may be disposed substantially as shown in FIGURE 7, i.e., a filament may lie transversely across the cylindrical needle 134 on each side thereof and within the peripheral grove 135 formed therein as viewed in FIGURE 7. On the other hand, it may well be that no filament actually lies across and within the groove. In any case, one and one only of the filaments 1 will be entrapped within the groove by the filament entrapping collar 144 in the operation thereof about to be described.

As soon as the filament pickup needle assembly 22 has reached the end of its downward stroke as just described, the finger 80 is displaced downwardly to permit the filament entrapping collar 144 to drop. Downward displacement of the finger 80 is effected by finger release cam 112 and the mechanism associated therewith described above in connection with the description of FIGURE 3. Since this dropping or downward movement of the filament entrapping collar 144 is a free fall, the length of its downward movement initially will be a function of the number of filaments piled up in the trough 15 on the left side of the filament pickup needle 134 and directly beneath the filament entrapping collar 144 as viewed in FIGURE 7.

With the filament entrapping collar 144 free, insofar as finger 80 is concerned, to drop until it comes to rest on the head of pin 140, the return stroke of the filament pickup needle assembly 22 is initiated. As this assembly starts up, the needle 134 will retract within the collar 144 if the latter has not already bottomed on the head of pin 140. As the needle 134 retracts within the collar 144, the filaments 1 in the trough 15 will tend to drop away from the needle, except those filaments which may lie on the left side of the needle as viewed in FIGURE 7 and which may be disposed between the upper edge of the groove 135 and the lower edge of the entrapping collar 144. If, during the final phase of the downward stroke of needle 134, a filament 1 had assumed a position lying across and within the groove 135 as shown in FIGURE 7, the other filaments lying alongside of and above it on the left side of the needle will be displaced back into the trough 15 by this combined upward movement of the needle and downward movement of the collar 144 and thus this one filament will be entrapped in the groove 135 by the filament entrapping collar 144. If, on the other hand, no filament is disposed in the groove 135 on the left side of needle 134 at the end of the downward stroke thereof, the combined upward movement of the needle 134 and downward movement of the collar 144 will tend to displace those filaments from lying between the upper edge of the groove 135 and the lower edge of the entrapping collar 144, urging one of them into the groove 135 and the remainder back into the trough 15.

Figure 5:
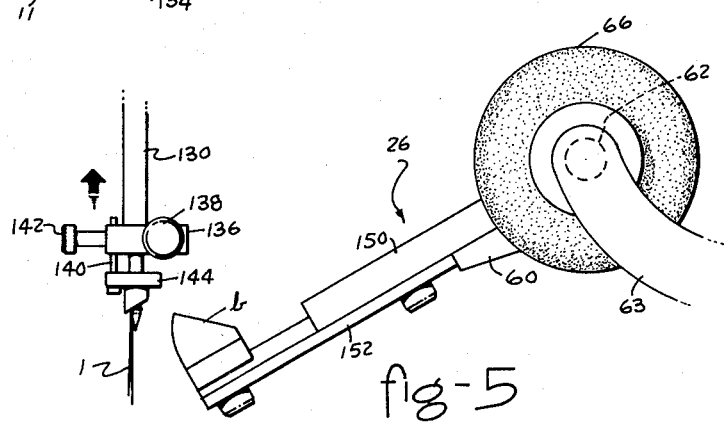
FIGURE 5 is a fragmentary detail of the pickup needle assembly with a filament depending therefrom in its delivery position and the filament transfer head in its retracted or rest position.

Thus it is apparent from the foregoing that in any case one filament will be entrapped in the groove 135 of the needle 134 as the filament pickup needle assembly backs off sufficiently to withdraw the needle from the filaments in the reservoir as shown in FIGURE 8. FIGURE 8 is a view looking in the direction 8—8 of FIGURE 7 but with the filament pickup needle assembly 22 backed off as just described. It will be noted in this figure, i.e., FIGURE 8, that the filament 1 has been gripped somewhere near but not necessarily at the midpoint thereof along its longitudinal axis. The state of the work at this point in the operating cycle is also shown in FIGURE 5.

With a single filament 1 held within the groove 135 of the pickup needle 134 by the filament entrapping collar 144 as just described, the cams 28 and 30 (FIG. 1) cooperate to cause the filament pickup needle assembly 22 to move through the curved path schematically illustrated by the curved arrow 24 in FIGURE 1 to deliver the filament to the filament transfer head 26. When the filament pickup needle assembly 22 reaches the end of this curved path, it will be in position to deliver the filament which it is carrying to the filament transfer head 26 which, at this point, as shown in FIGURE 5, is in its retracted or rest position. The filament transfer head 26 is then advanced from its FIGURE 5 position to its FIGURE 6 position by the cam 94 (FIG. 3) and its associated mechanism. The filament transfer head 26, during this forward stroke, displaces the limp filament hanging from the needle 134 from its disposition as shown in FIGURE 5 to its disposition as shown in FIGURE 6, i.e., the front end of the filament transfer head 26 deflects the filament hanging from the needle 134 and causes it to lie on the head 26.

Figure 6:
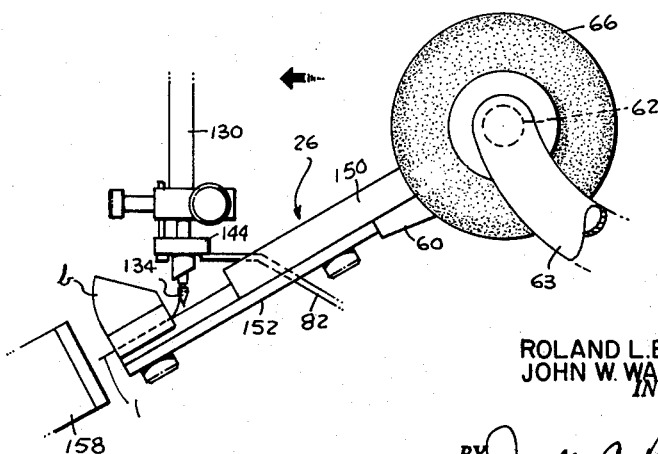
FIGURE 6 is a fragmentary detail similar to FIGURE 5 but with the filament transfer head nearing the end of its movement into position to receive the filament depending from the needle of the filament pickup needle assembly.

The filament transfer head 26 to which the lamp filament 1 is delivered by the filament pickup needle assembly 22 comprises, as shown in FIGURE 6, a plate 150 attached at one end thereof to an end of rocker arm 60 (see also FIGURE 3) and a bottom cover 152. The forward end of plate 150 is provided with a pair of side guides $a$ and $b$ and a center guide $c$, all three of which are shown in FIGURES 1 and 2 and one of which is shown in FIGURES 5 and 6 and other subsequent figures. The guides $a$, $b$ and $c$ are spaced from one another on the front end of the plate 150 in such a manner that the legs of the limp, substantially horseshoe-shaped filament 1 will be positioned astride the center guide $c$ and extend through channels defined therefor by guides $a$ and $c$ on the one hand and guides $c$ and $b$ on the other hand, the bight of the filament being disposed rearwardly of the center guide $c$.

FIGURE 6 illustrates the relative disposition of the work, the filament transfer head and the pickup needle assembly just before the filament is released by the needle 134 and just before the filament transfer head reaches the end of its forward stroke to receive the filament. It will be noted in this figure that the free ends of the legs of the filament extend beyond the front end of the transfer head but are spaced from a stationary filament-positioning stop 158. At about the same time that this forward stroke of the filament transfer head 26 is completed, the finger 82 (FIG. 6) is rotated clockwise by the finger release cam 112 and its associated mechanism shown in FIGURE 3 and described above in connection therewith to displace the filament entrapping collar 144 sufficiently to release the filament held thereby. Release of the filament from the needle 134 to the inclined surface of plate 150 of filament transfer head 26 permits the filament to slide on the plate 150 until the legs thereof engage the filament-positioning stop 158 as shown in FIGURE 9. Thus the stop 158 provides a means for centering the filament on the transfer head 26 if one leg happens to be longer than the other when it was picked up by the needle 134 as shown in FIGURE 8. This arrangement also insures a uniform overhang of the filament legs extending beyond the front end of the transfer head 26 and thus, in turn, insures a uniform overhang of the filament legs when they are secured to the hooked ends of the lead-in wires of the lamp stem.

As noted above in connection with the description of FIGURE 3, the rocker arm 60, to which the plate 150 of the filament transfer head 26 is attached, is pinned intermediate its ends to a tube 62 which is freely rotatable within the bifurcated end of slide 66, the tube 62 having an air line 63 connected to one end thereof. The tube 62 has a pair of spaced ports, not shown, formed therein, these spaced ports being in register with a pair of channels 154 cut in the lower face of plate 150 (FIG. 9). The bottom cover 152 lies over these channels 154 thereby defining therewith a pair of longitudinally extending closed passages within the filament transfer head 26. A plurality of ports 156 are formed in the top face of plate 150 between guides $a$ and $c$ on the one hand and $c$ and $b$ on the other hand, these ports being in communication with the pair of channels 154. This arrangement defines a vacuum system for holding the limp, horseshoe-shaped filament on the filament transfer head 26 after it has been centered as described above by the stop 158. As soon as the filament has been centered, the air line 63 is opened to a vacuum pump and the suction caused thereby at the ports 156 over which the legs of the filament lie secures the filament in its adjusted position on the transfer head. The filament is now ready to be delivered to the lamp stem to which it is to be secured.

It will be recalled that in the foregoing description of FIGURE 3, it was pointed out that means are provided for reciprocating the filament transfer head 26 in a horizontal plane and for rocking it about the tube 63 as a pivot point. The former is effected by the cam 94 and its associated mechanism; the latter is effected by the cam 84 and its associated mechanism. Delivery of the filament 1 to a lamp stem is effected by a combination of these two movements as illustrated in FIGS. 9–12. As shown in these figures, the hooked ends of a pair of lead-in wires 25 of a lamp stem 21 are supported in the anvil 23 of a filament clamping device. The stem 21, as shown in FIGURE 3, is supported by a stem machine head 27, a fragmentary portion of which is shown. The filament transfer head 26 is rotated clockwise as shown in FIGURE 10 and advanced to the left as shown in FIGURE 11 to place the free ends of the legs of the filament 1 in the hooks of the lead-in wires 25. The filament transfer head is then rotated counter-clockwise as shown in FIGURE 12 to move the free ends of the legs of the filament downwardly within the hooks until they bottom in the bights thereof. With the legs of the filament so disposed, suitable clamping means, not shown and comprising no part of this invention, close the hooks about the legs of the filament and thus secure it to the lamp stem.

As soon as the filament 1 has been secured to the lead-in wires 25, the connection of air line 63 to a vacuum pump is closed, thus terminating the suction at the ports 156 and freeing the filament. The filament transfer head 26 is then rotated counter-clockwise until the guides $a$, $b$ and $c$ have been moved clear of the filament 1 which has been secured to the lead-in wires 25. The stem or mount machine head is thus free to advance the stem 21 with the filament 1 secured thereto to the next work station of the lamp stem fabricating apparatus of which it is a part, and advance the next machine head into position so that the stem which it supports may be provided with a filament. The filament transfer head 26 is returned from the filament delivery position shown in FIGURE 12 to its rest position as shown in FIGURE 4 by the cams 84 and 94 (FIG. 3) and their associated mechanisms.

An operating cycle of the apparatus will now be described with particular reference to the cam chart illustrated in FIGURE 13. At the outset, it should be noted that, although the filament pickup needle assembly and the filament transfer head obviously cooperate with one another, the former returns to its pickup position during the time interval when the latter is delivering a filament to a lamp stem. With this thought in mind, the description of the operating cycle in terms of the cam chart of FIG. 13 will begin at about 80°.

At 80°, the filament pickup needle assembly is located at its delivery position i.e., it has just delivered a filament to the filament transfer head 26. From 80° to 160°, the horizontal pickup cam 30 provides the horizontal component of this return stroke. The vertical component of this return stroke is provided by the vertical pickup cam 28 between 110° and 180°. At this point the needle 134 is disposed in the reservoir 11 as shown in FIG. 7. From 180° to 195° the finger release cam 112 trips the finger 80 and thereby releases the filament entrapping collar 144. The vertical component of the delivery stroke of the filament pickup needle assembly 22 is initiated at 210°. The horizontal component of the delivery stroke of this assembly is initiated at 220°. Between 220° and 235° the finger 80 is returned to its normal rest position by the finger release cam 112. The vertical component of the transfer stroke of the filament pickup needle assembly 22 is completed at 310° and the horizontal component thereof is completed at 350°. Thus, at 350°, the needle assembly is ready to deliver the filament which it is carrying to the filament transfer head 26. However, as shown in FIGURE 5, the filament transfer head 26 is not yet ready to receive the filament because at this point of time it has just returned to its rest position after having delivered the preceding filament to a lamp stem.

The relative location of the filament transfer head 26 in terms of the cams which actuate it is illustrated in FIG. 13 by the horizontal transfer cam 94 and the rocking transfer cam 84. The rocking transfer cam 84 is at rest but, starting at 340°, the horizontal transfer cam 94 initiated the horizontal stroke of the filament transfer head from the rest position. This stroke continues until 70° at which time the transfer head will be in position to receive the filament from the pickup needle 134. The relative disposition of the filament pickup needle assembly 22 and the filament transfer head 26 shortly before 70° is illustrated in FIG. 6. As the transfer head 26 approaches the end of this horizontal stroke the finger release cam 112 starts, at 55°, to trip the finger 82 to release the filament entrapping collar 144 from gripping engagement with respect to the filament carried by the pickup needle assembly. At 75°, the filament is released, drops onto the transfer head 26 and slides forward until the legs thereof engage the filament positioning stop 158 as shown in FIG. 9. As described above the filament transfer head 26 is now connected to a source of vacuum to provide sufficient suction to hold the filament in position for the transfer operation.

The first phase of the actual delivery stroke begins at about 115° when the rocking transfer cam 84 causes the transfer head 26 to swing clockwise from the FIG. 9 position to the FIG. 10 position. This clockwise movement is completed at about 170°. Between 165° and 175°, the horizontal transfer cam 94 advances the transfer head 26 from the FIG. 10 position to the FIG. 11 position to thereby place the free ends of the filament within the hooks of the lead-in wires 25. The rocking transfer cam 84, between 180° and 190°, imparts a slight counter-clockwise motion to the transfer head 26 from the FIG. 11 position to the FIG. 12 position to thereby move the free ends of the legs of the filament down into the bights of the hooked lead-in wires. The filament is now in position to have the free ends thereof clamped in the hooked ends of the lead-in wires 25. This clamping operation, which forms no part of this invention, takes place at about 205°.

With the filament now secured to the lead-in wires, the filament transfer head 26 is returned to its rest position. The horizontal component and the rocking component of this return stroke are effected in a stepped manner in order to permit the guides *a*, *b* and *c* to clear the filament and the filament positioning stop 158. This stepped return stroke is illustrated in FIG. 13, the rocking component thereof being completed at about 265° and the horizontal component being completed at about 305°. Thus, between 305° and 340° the filament transfer head 26 is in its rest position and ready for the next operating cycle thereof to move in and receive the next filament from the filament pickup needle assembly 22.

Although the specific embodiment of our invention is described above and illustrated in the accompanying drawings in connection with the selection of a coiled filament from a supply thereof, presenting the filament so selected to a transfer head and in turn then presenting the filament to an article of work, viz., a lamp stem, it will be readily understood by those skilled in the art that the method and apparatus of our invention may be readily employed in the selection of wires other than coiled filaments and/or presenting the wires to any article-receiving member, not necessarily a transfer head.

What we claim is:

1. In apparatus for selecting a wire from a supply thereof, the combination of: a reservoir within which a plurality of wires are disposed; a pickup needle having a groove at the lower end thereof; means for reciprocating said needle into and out of the body of wires in said reservoir; and means comprising a sleeve shiftable along the needle and biased to move downwardly of the needle so that at least a portion thereof is opposite said groove for trapping one of said wires in said needle by the withdrawal stroke of said needle said wire having been initially engaged in said groove when the needle had been inserted into the reservoir and withdrawn.

2. In apparatus for selecting a wire from a supply thereof, the combination of: a reservoir within which a plurality of wires are disposed; a pickup needle having a wire-receiving groove formed therein; a wire-entrapping collar slidably disposed on said needle; means for reciprocating said needle into and out of the body of wires in said reservoir; and means for effecting relative displacement of said collar on said needle in a direction away from the point of the needle, said collar being biased downwardly of the needle, whereby the entire collar is disposed above said groove in said needle when said needle is disposed in said body of wires and at least a portion of said collar overlies at least a portion of said groove during the withdrawal of said needle from said body of wires whereby one of said wires is initially held in said groove during the initial retraction of the needle and is subsequently trapped in said groove by an overlying portion of said collar.

3. In combination with the apparatus of claim 2, means for advancing said needle with said trapped filament to a transfer point; a transfer head; means for advancing said transfer head into filament-receiving position with respect to said needle at said transfer point; means for releasing said filament from said needle to said transfer head at said transfer point; means for securing said filament on said transfer head; and means for advancing said transfer head with said filament secured thereon from said transfer point to a delivery position whereby said filament is presented to an article of work.

4. In combination with the apparatus of claim 2, means for advancing said needle with said trapped filament to a transfer point; a transfer head; means for advancing said transfer head into filament-receiving position with respect to said needle at said transfer point; means for releasing said filament from said needle to said transfer head at said transfer point; means for orienting said filament on said transfer head; means for securing said filament on said transfer head; and means for advancing said transfer head with said filament secured thereon from said transfer point to a delivery position whereby said filament is presented to an article of work.

5. In apparatus for selecting a wire from a supply thereof, the combination of: a reservoir within which a plurality of wires are disposed, a pick-up needle having a conical end and a groove adjacent said end, means for reciprocating said needle into and out of the body of wires in said reservoir, a sleeve freely slidable on said collar and having a lower bevelled end, means for restraining the sleeve from movement with the needle on downward movement of the needle into the reservoir and for subsequently releasing the collar to allow it to come to rest on the wires in the reservoir, said groove in the needle initially engaging a wire and lifting the same on the upward travel of the needle, and the lower bevelled end of said collar subsequently entrapping the wire engaged in the groove of the needle by upward sliding motion of the needle relative to the collar.

References Cited in the file of this patent

UNITED STATES PATENTS

| 1,258,016 | Kepner | Mar. 5, 1918 |
| 1,962,902 | Kunath | June 12, 1934 |
| 2,883,072 | Louden | Apr. 21, 1959 |